United States Patent
Gagnon et al.

(10) Patent No.: US 9,618,927 B2
(45) Date of Patent: Apr. 11, 2017

(54) METHOD OF DETERMINING A RADIUS OF A CUTTING END OF A TOOL FOR A TURNING MACHINE

(71) Applicant: PRATT & WHITNEY CANADA CORP., Longueuil (CA)

(72) Inventors: Lafleche Gagnon, Sainte-Julie (CA); Rachid Guiassa, Montreal (CA); Philippe St-Jacques, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 417 days.

(21) Appl. No.: 14/252,910

(22) Filed: Apr. 15, 2014

(65) Prior Publication Data

US 2015/0292854 A1   Oct. 15, 2015

(51) Int. Cl.
  *G05B 19/401* (2006.01)
  *G05B 19/19* (2006.01)
  *G01B 5/08* (2006.01)
  *G01B 5/213* (2006.01)

(52) U.S. Cl.
  CPC ............. *G05B 19/401* (2013.01); *G01B 5/08* (2013.01); *G01B 5/213* (2013.01); *G05B 19/19* (2013.01); *G05B 2219/37404* (2013.01); *G05B 2219/37405* (2013.01); *G05B 2219/37406* (2013.01); *G05B 2219/37407* (2013.01)

(58) Field of Classification Search
  None
  See application file for complete search history.

(56) References Cited

U.S. PATENT DOCUMENTS

| | | |
|---|---|---|
| 4,428,055 A | 1/1984 | Kelley et al. |
| 4,694,184 A | 9/1987 | Pryor |
| 4,839,526 A | 6/1989 | Pryor |
| 4,879,817 A | 11/1989 | McMurtry |
| 4,899,094 A | 2/1990 | Pilborough |
| 5,109,610 A | 5/1992 | Johnson |
| 5,871,391 A | 2/1999 | Pryor |
| 7,440,814 B2 | 10/2008 | McPherson et al. |
| 8,543,237 B2 | 9/2013 | Slettemoen et al. |
| 2003/0088991 A1 | 5/2003 | Fullerton |
| 2004/0139621 A1 | 7/2004 | Lysen |
| 2015/0088454 A1* | 3/2015 | Sugiyama ............... G01B 5/008 702/155 |

FOREIGN PATENT DOCUMENTS

GB    1601571    10/1981

* cited by examiner

*Primary Examiner* — Qing Wu
(74) *Attorney, Agent, or Firm* — Norton Rose Fulbright Canada LLP

(57) ABSTRACT

A method of determining a radius of a cutting end of a tool for a turning machine using a touch probe is provided. One of the cutting end and the touch probe is movable relative to a reference frame having a first axis and a second axis and having a reference point trackable in the reference frame. The method comprises establishing a first contact point and recording a first coordinate of the reference point on the first axis; establishing a second contact point and recording a second coordinate of the reference point on the second axis; establishing a third contact point and recording a third coordinate of the reference point on the first axis and a fourth coordinate of the reference point on the second axis upon contact; and determining a radius of the cutting end based on the first, second, third and fourth coordinates.

14 Claims, 6 Drawing Sheets

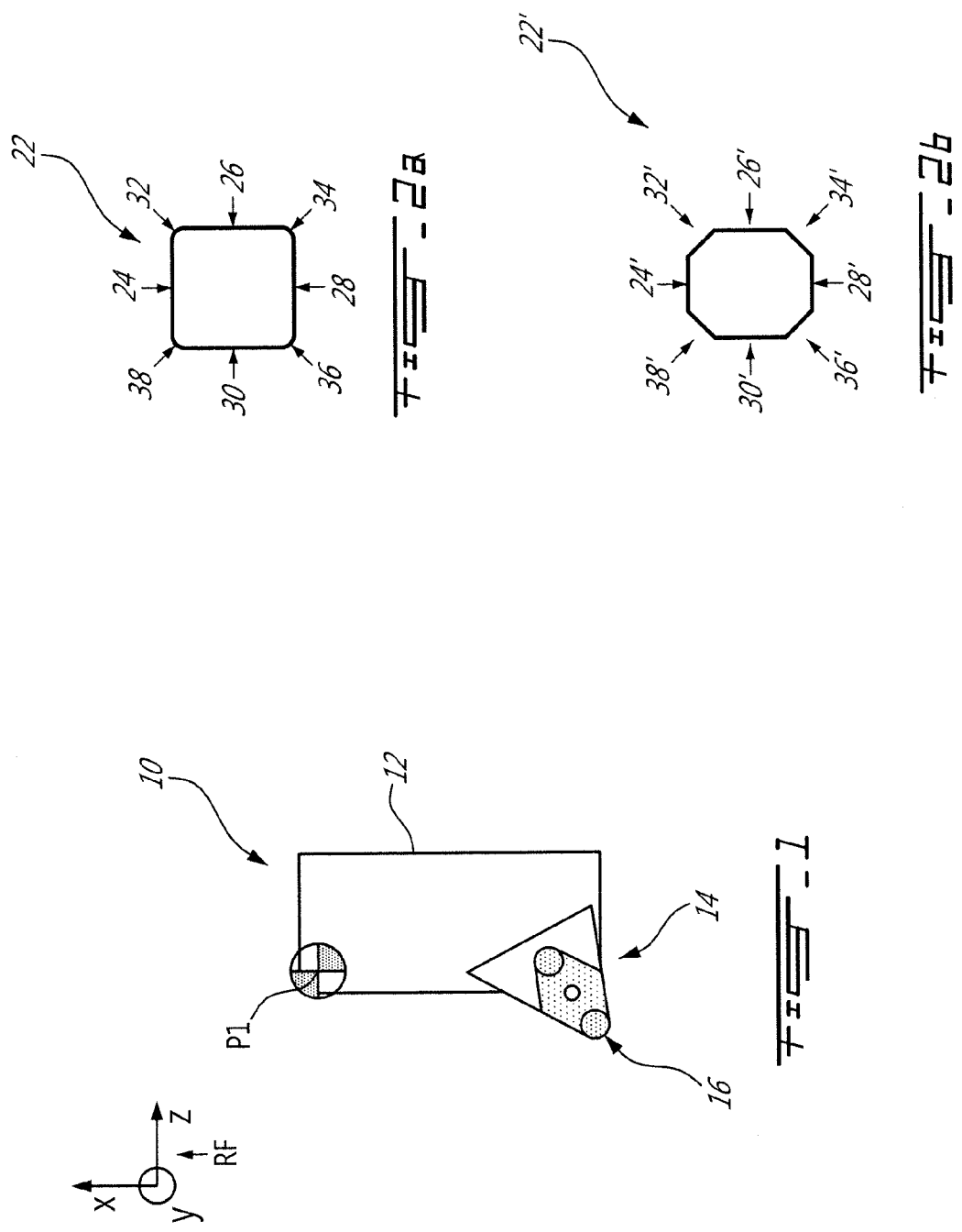

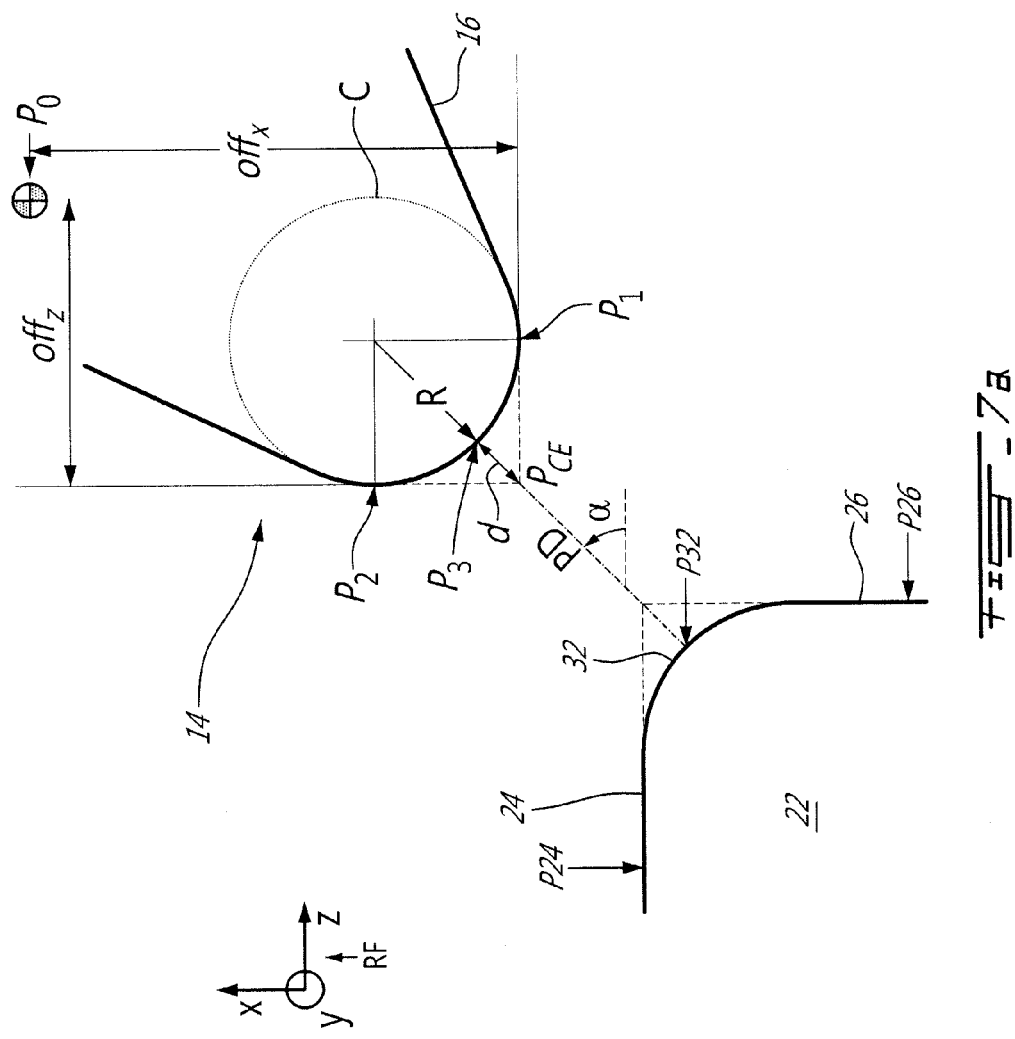

METHOD OF DETERMINING A RADIUS OF A CUTTING END OF A TOOL FOR A TURNING MACHINE

TECHNICAL FIELD

The application relates generally to methods of determining radii of tools, and more specifically of tools for turning machines.

BACKGROUND OF THE ART

Turning machines, such as in-turn, mill-turn, and lathes, CNC use tools to carve channels or sections in a rotating part. The tools include a cutting end which, as sharp as it may be, has a rounded portion at its tip. The positioning of the cutting end of the tool determines a position of the channel or section to be removed. In some application, the position of the tool may be required with greater precision before the tool is used. In order to determine the position of the tool, probes, for example mechanical or optical, may be used.

Touch probes typically contact the tool at various locations to determine a position of the tool's cutting end in a plane. A radius of the cutting end's rounded portion is based on nominal values given by the manufacturer of the tool. The nominal values may not correspond enough to the actual radius of the cutting end which could lead to imprecise cutting.

Optical sensors such as laser beam detectors can be used to scan the cutting end of the tool in order to determine its radius. The optical methods are however calculation intensive, and can be sensitive to noise coming from chips of material or thin layers of fluids.

SUMMARY

In one aspect, there is provided a method of determining a radius of a cutting end of a tool for a turning machine using a touch probe, one of the cutting end and the touch probe being movable relative to a reference frame having a first axis and a second axis, the one of the one of the cutting end and the touch probe having a reference point trackable in the reference frame, the method comprising: a) establishing a first contact point between the touch probe and the cutting end and recording a first coordinate of the reference point on the first axis, the first contact point having a known coordinate on the first axis; and b) establishing a second contact point between the touch probe and the cutting end and recording a second coordinate of the reference point on the second axis, the second contact point having a known coordinate on the second axis; and c) establishing a third contact point between the touch probe and the cutting end by moving an end point of the one of the cutting end and the touch probe along a predetermined direction at an angle with the first and second axes and recording a third coordinate of the reference point on the first axis and a fourth coordinate of the reference point on the second axis upon contact, the pre-determined direction being dependent on the coordinate of the first contact point on the first axis and the coordinate of the second contact point on the second axis, the end point being offset from the reference point by an amount deduced from the first coordinate and the second coordinate recorded at steps a) and b); and d) determining a radius of the cutting end based on the first, second, third and fourth coordinates.

In another aspect, there is provided a method of determining a radius of a cutting end of a tool for a turning machine using a touch probe, one of the cutting end and the touch probe being movable relative to a reference frame having a first axis and a second axis, the one of the one of the cutting end and the touch probe having a reference point trackable in the reference frame, the method comprising: a) recording a first coordinate of the reference point on the first axis upon contacting the touch probe and the cutting end at a first contact point having a known coordinate on the first axis; b) calculating a first offset of an end point of the one of the cutting end and the touch probe relative to the reference point on the first axis based on the first coordinate; c) recording a second coordinate of the reference point on the second axis upon contacting the touch probe and the cutting end at a second contact point having a known coordinate on the second axis; and d) calculating a second offset of the end point relative to the reference point on the second axis based on the second coordinate; e) recording a third coordinate of the reference point on the first axis and a fourth coordinate of the reference point on the second axis upon moving an end point of the one of the cutting end and the touch probe along a predetermined direction and contacting the touch probe and the cutting end at a third contact point along the predetermined direction, the third contact point having known coordinates on the first and second axes, the predetermined direction being at an angle with the first and second axes and being determined from the coordinate of the first contact point on the first axis and the coordinate of the second contact point on the second axis, the end point calculated using the first and second offsets; and f) determining a radius of the cutting end based on the first, second, third and fourth coordinates.

In yet another aspect, there is provided a turning machine comprising: a tool having a cutting end; a touch probe having two flat faces and one of a rounded and angled corner joining the two flat faces; and an electronic control unit (ECU) controlling the one of the tool and the probe to move in a reference frame to establish separate contacts between the probe and the tool at a first point on one of the two flat faces, at a second point on the other one of the two flat faces and at a third point on the one of the rounded and angled corner, the ECU being configured to record coordinates of a reference point of the one of the tool and the probe during the separate contacts so as to calculate a radius of the cutting end.

DESCRIPTION OF THE DRAWINGS

Reference is now made to the accompanying figures in which:

FIG. 1 is a schematic view of a tool for a turning machine;

FIG. 2a is a schematic top plan view of a touch probe according to a first embodiment;

FIG. 2b is a schematic top plan view of a touch probe according to a second embodiment;

FIG. 7a is a close-up view of the tool of FIG. 1 and the touch probe of FIG. 2a shown in a fifth position relative to each other;

DETAILED DESCRIPTION

Figure 3:
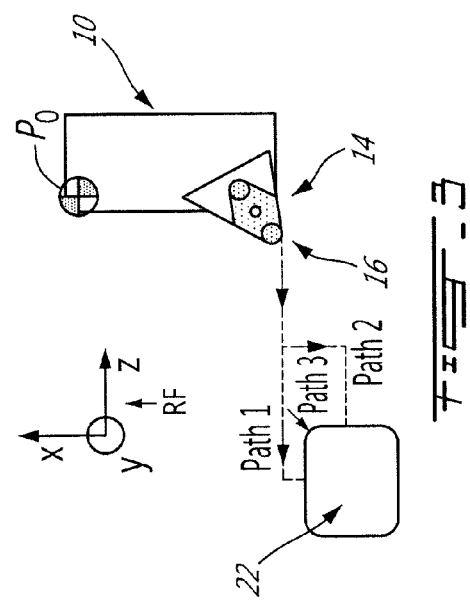
FIG. 3 is a schematic view of the tool of FIG. 1 and the touch probe of FIG. 2a shown in a first position relative to each other.

Referring to FIG. 1, a tool 10 for a turning machine is shown. The tool 10 includes a body 12 and a cutting portion 14 for use, for example, in in-turn or mill-turn machines, the machines also being known as lathes, CNC, turning machines etc. The cutting portion 14 has a cutting end 16. The tool 10 may be used to manufacture parts, such as metallic components, by carving out portions of the rotating part using the tool 10. The parts may then be used in a variety of industries including the aeronautics industry. In turning machines, the parts are cylindrical, revolve about their centerline with the tool 10 abutting on their external surface. The cutting end 16 of the tool 10 creates an indentation. As the tool 10 is moved deeper into the rotating part, material is removed from the part and various cut-outs and channels can be created. A position of the cut-out is predetermined in function of a desired shape of the part, and the tool 10 is moved by the turning machine in a precise fashion to accomplish the desired shape of the part. This is commonly known as grooving, and other operations are possible as well, such as facing and face grooving.

The cutting end 16 may have various shapes and be more or less sharp depending on the desired shape of the part. Whatever the sharpness of the cutting end 16, it includes a rounded portion at the tip. The rounded portion may be approximated by a portion of a circle C (a close-up view on the cutting end 16 showing the circle C is shown in FIG. 7a). For smaller cut-outs where precision may be even more desired, an actual radius R of the cutting end 16 may be a desirable information. While a radius of the cutting end 16 may be obtained from a manufacturer of the cutting portion 14 (i.e. nominal value), there may be a discrepancy between the nominal value and the actual value of the radius R of the cutting end 16. This discrepancy may cause a discrepancy between the desired shape of the part and the obtained shape of the part.

In order to decrease a potential discrepancy between the nominal value and the actual value of the radius R of the cutting end 16, the tool 10 may be tested to determine the actual value of the radius R of the cutting end 16 prior to use on the part. The method by which the actual value of the radius R of the cutting end 16 is determined will be described below. The method includes the determination of coordinates of various points along the cutting end 16 using a touch probe.

Turning now to FIGS. 2a and 2b, FIG. 2a shows a first embodiment of a touch probe 22 for use in the determination of the actual value of the radius R of the cutting end 16. The touch probe 22 has a generally square cross-section with rounded corners and is shown in FIG. 2 in a top plan view (e.g. cubic shape, rectangular prism shape). The touch probe 22 includes at least four flat sides, namely sides 24, 26, 28, 30 and four rounded corners, namely corners 32, 34, 36, 38.

The corners 32, 34, 36, 38 have a same radius of curvature, but it is contemplated that the corners 32, 34, 36, 38 could each have a different radius of curvature. Typically, the touch probe 22 deflects when touching an object. Touching one side 24, 26, 28, 30 or one corner 32, 34, 36, 38 gives a signal to the machine controller to record the actual positions. The touch probe 22 is linked to an electronic control unit (ECU) (not shown) which may record information every time the touch probe 22 sends a signal corresponding to one of the sides 24, 26, 28, 30 or corners 32, 34, 36, 38 being in physical contact with an object.

The touch probe 22 includes various sides 24, 26, 28, 30 and corners 32, 34, 36, 38 allowing the use of the touch probe 22 in a variety of direction and positions without having to greatly manipulate it, such as rotating it. With the use of the sides 24, 26, 28, 30 and corners 32, 34, 36, 38, the touch probe 22 could be used in at least 8 orientations of the tool 10 relative to the touch probe 22 in a 360° circumference.

The touch probe 22 shown in FIG. 2a is only one example of touch probe adapted for the below method of determining the radius R of the cutting end 16. FIG. 2b shows a second embodiment of a touch probe 22' for use in the determination of the actual value of the radius R of the cutting end 16. The touch probe 22' is similar to the touch probe 22 except that it features angled corners 32', 34', 36', 38' in place of rounded corners 32, 34, 36, 38 in between flat sides 24', 26', 28', 30'. The angled corners 32', 34', 36', 38' are disposed at 45 degrees of the flat sides 24', 26', 28', 30'. Other angular orientations of the angled corners 32', 34', 36', 38' are contemplated. It is contemplated that the touch probe 22 could yet have other shapes. For example, the touch probe 22 could have a triangular or rectangular cross-section instead of a square cross-section. The touch probe 22 could also have only one side.

Turning to FIG. 3, the tool 10 is shown in relation with the touch probe 22 for proceeding to the determination of the radius R of the cutting end 16. The touch probe 22 is used in a turning machine (not shown) with the tool 10 located as it would be to carve a part. It is however contemplated that the touch probe 22 and the tool 10 could be used outside of the turning machine to determine the radius R of the cutting end 16 of the tool 10. The turning machine has a fixed reference frame RF which defines a X-axis and an in-plane Z-axis. In the embodiment described in relation to the Figures, the touch probe 22 is oriented to have its sides 24, 26, 28, 30 aligned with the X- and Z-axes of the reference frame RF. The touch probe 22 and the tool 10 may move in a plane of the X- and Z-axes relative to one another.

The touch probe 22 allows determining coordinates of several points $P_1$, $P_2$, $P_3$ of the cutting end 16 (shown best in FIG. 7a) relative to a reference point $P_0$ of the tool 10 to later calculate the radius R of the cutting end 16. In the embodiment described herein, the reference point $P_0$ is a fixed point of the tool 10 and is movable within the reference frame RF. An ECU (which may or may not be a same ECU as the one linked to the touch probe 22) records the position of the reference point $P_0$ at all times t: $(P_0{}^t(X), P_0{}^t(Z))$. From the position of the reference point $P_0$ at all times and coordinates of the touch probe 22 which may be known from calibration, can be deduced the coordinates of the points $P_1$, $P_2$, $P_3$ of the cutting end 16. As shown in FIG. 3, the tool 10 may use 3 different paths, namely path 1, path 2, path 3, to contact the touch probe 22 at three associated locations, in this embodiment sides 24, 26 and corner 32.

An out-of-plane Y-axis may also be defined, the X,Y,Z-axes forming together an orthogonal reference frame. The tool 10 has a reference point $P_0$ which allows determining a position of the tool 10 in the reference frame RF. In the example described herein, the touch probe 22 is fixed relative to the reference frame RF, while the tool 10 is movable relative to the reference frame RF. It is contemplated that the tool 10 could be fixed relative to the reference frame RF, while the touch probe 10 could be movable relative to the reference frame RF.

Figure 6:
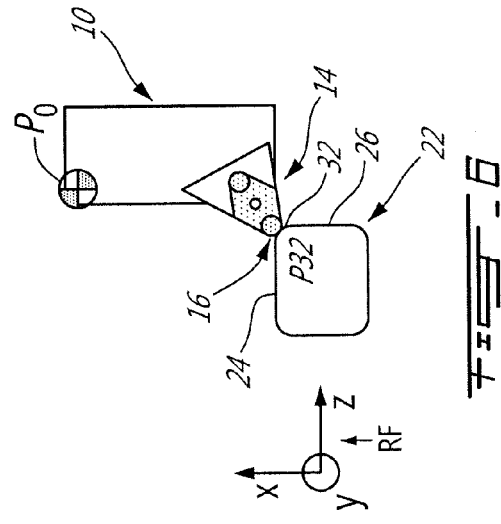
FIG. 6 is a schematic view of the tool of FIG. 1 and the touch probe of FIG. 2a shown in a fourth position relative to each other.
Figure 7B:
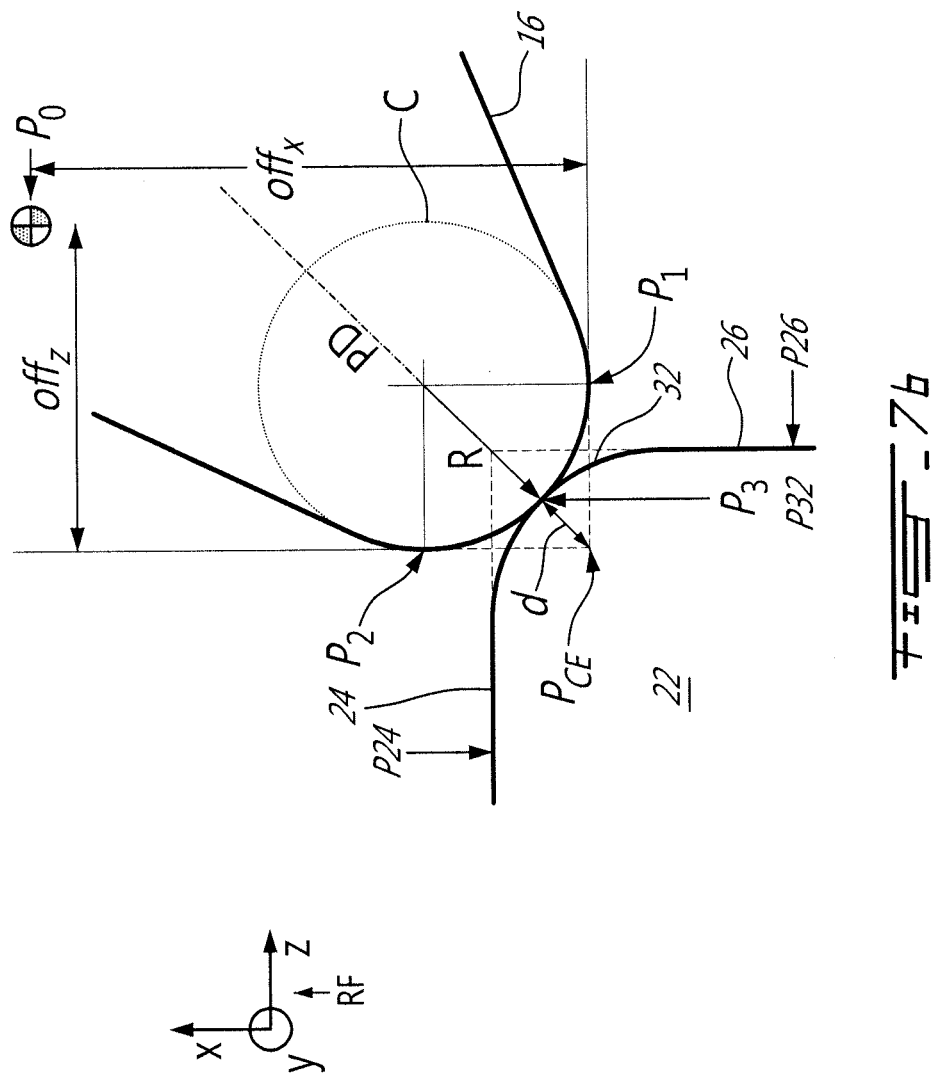
FIG. 7b is a close-up view of the tool of FIG. 1 and the touch probe of FIG. 2a shown in the fourth position relative to each other shown in FIG. 6.
Figure 8:
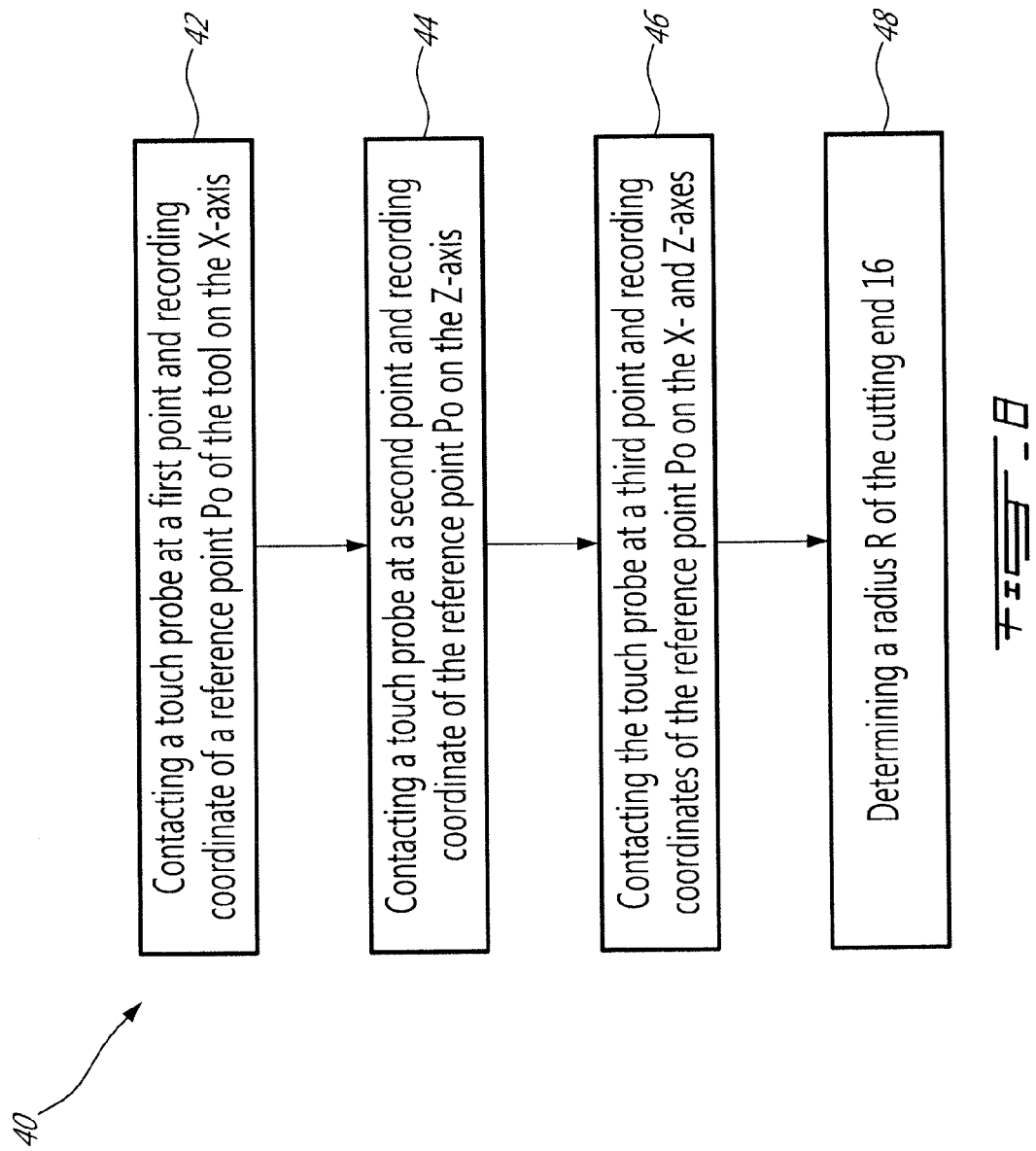
FIG. 8 is a flow chart of a method of determining a radius of the tool of FIG. 1 using any one of the touch probes of FIG. 2a or 2b.

Turning now to FIGS. 4 to 8, a method 40 of determining the radius R of the cutting end 16 will be described. FIGS. 4 to 7b show different positions of the tool 10 relative to the touch probe 22, and FIG. 8 is a flow chart with the different steps of the method 40.

Figure 4:
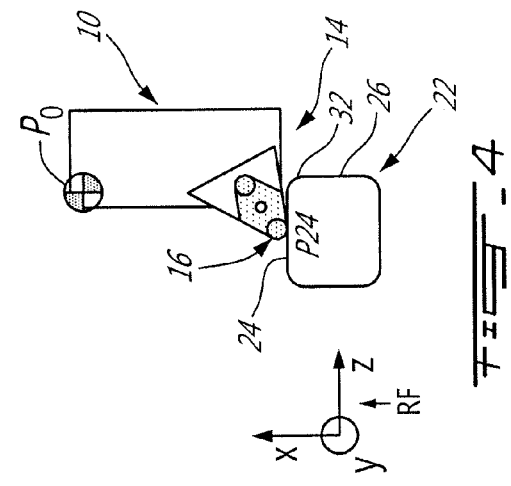
FIG. 4 is a schematic view of the tool of FIG. 1 and the touch probe of FIG. 2a shown in a second position relative to each other.

The method 40 starts at step 42 by a contact between the tool 10 and the touch probe 22 at a first point $P_{24}$ having a known position on the X-axis and recording a coordinate of the reference point $P_0$ of the tool on the X-axis (FIG. 4).

Referring more specifically to FIGS. 3 and 4, a numerical command moves the tool 10 along the path 1 based on information obtained during calibration. Calibration information include a position of the side 24 in the reference frame RF on the X-axis, $X_{24}$. Motion of the tool 10 stops when the tool 10 contacts the side 24 of the touch probe 22. As the point $P_1$ of the cutting end 16 contacts the touch probe 22 (time t=t1) at point $P_{24}$, the touch probe 22 triggers an electrical signal which commands the tool 10 to stop its course. Coordinates of the reference point $P_0$ are then read and the X-coordinate of the reference point $P_0$, $P_0^{t=t1}(X)$ is recorded by the ECU. The side 24 being aligned with the Z-axis, any point of the side 24 has a same X-coordinate $X_{24}$. Although the cutting end 16 is shown in FIG. 4 contacting a middle of the side 24 (i.e. point $P_{24}$), it should be understood that the cutting end 16 may contact any point along the side 24. It is also contemplated that the side 28 could have been used in place of the side 24 of the touch probe 22.

From the determination of $P_0^{t=t1}(X)$, various values can be obtained. These values may be obtained by the ECU at step 42 or at a later step.

At time t=t1, the X-coordinate of the point $P_1$, $P_1^{t=t1}(X)$ is equal to the X-coordinate $X_{24}$ of the point $P_{24}$.

From $P_0^{t=t1}(X)$ and $P_1^{t=t1}(X)$ can be deduced a position of the first point $P_1$ relative to the reference point $P_0$, i.e. an offset $\text{Off}_X$ of the cutting end 16 on the X-axis.

$$\text{Off}_X = P_1^{t=t1}(X) - P_0^{t=t1}(X) \quad \text{(Eq. 1)}$$

Since, at time t=t1, $P_1^{t=t1}(X)$ is equal to $X_{24}$, $$\text{Off}_X = X_{24} - P_0^{t=t1}(X) \quad \text{(Eq. 2)}$$

The offset $\text{Off}_X$ may be used to deduce the radius R of the cutting end 16 in a below step.

The offset $\text{Off}_X$ being known, the X-coordinate of the first point $P_1$ can be known at all times.

$$P_1^t(X) = P_0^t(X) + \text{Off}_X \quad \text{(Eq. 3)}$$

When the value of $P_0^{t=t1}(X)$ is recorded and optionally the value of the offset $\text{Off}_X$ obtained at this step, the touch probe 22 is moved back to its original position shown in FIG. 3 so as to undo the contact between the touch probe 22 and the tool 10.

From step 42, the method 40 goes to step 44, to contact the touch probe 22 at a second point $P_{26}$ having a known position on the Z-axis and recording a coordinate of the reference point $P_0$ of the tool on the Z-axis.

Figure 5:
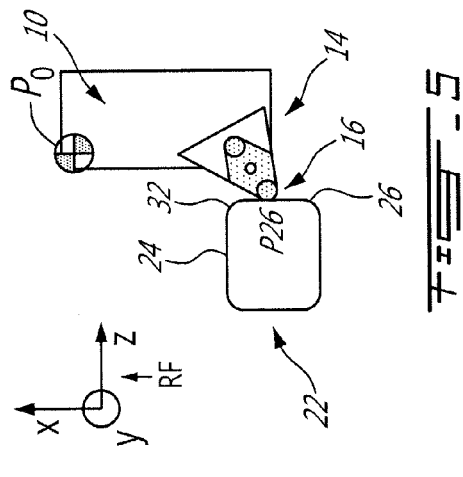
FIG. 5 is a schematic view of the tool of FIG. 1 and the touch probe of FIG. 2a shown in a third position relative to each other.

Referring more specifically to FIG. 5, a numerical command moves the tool 10 along the path 2 based on information obtained during calibration. Calibration information include a position of the side 26 in the reference frame RF, $Z_{26}$. Motion of the tool 10 stops when the tool 10 contacts the side 26 of the touch probe 22. As the point $P_2$ of the cutting end 16 contacts the point $P_{26}$ of the touch probe 22 (time t=t2), the touch probe 22 triggers an electrical signal which commands the tool 10 to stop its course. Coordinates of the reference point $P_0$ are read and the Z-coordinate of reference point $P_0$, $P_0^{t=t2}(Z)$, is recorded by the ECU. The side 26 being aligned with the X-axis, any point of the side 26 has a same Z-coordinate $Z_{26}$. Although the cutting end 16 is shown in FIG. 5 contacting a middle of the side 26 (i.e. point $P_{26}$), it should be understood that the cutting end 16 may contact any point along the side 26. It is also contemplated that the side 30 could have been used in place of the side 26 of the touch probe 22.

From the determination of $P_0^{t=t2}(Z)$, various values can be obtained. These values may be obtained by the ECU at step 44 orate later step.

At time t=t2, the Z-coordinate of the point $P_2$, $P_2^{t=t2}(Z)$ is equal to the Z-coordinate $Z_{26}$ of the point $P_{26}$.

From $P_0^{t=t2}(Z)$ and $P_2^{t=t2}(Z)$ can be deduced a position of the point $P_2$ relative to the reference point $P_0$, i.e. an offset $\text{Off}_Z$ of the cutting end 16 on the Z-axis.

$$\text{Off}_Z = P_2^{t=t2}(Z) - P_0^{t=t2}(Z) \quad \text{(Eq. 4)}$$

Since, at time t=t2, $P_2^{t=t2}(Z)$ is equal to $Z_{26}$, $$\text{Off}_Z = Z_{26} - P_0^{t=t2}(Z) \quad \text{(Eq. 5)}$$

The offset $\text{Off}_Z$ may be used to deduce the radius R of the cutting end 16 in a below step.

The offset $\text{Off}_Z$ being known, the Z-coordinate of the point $P_2$ can be known at all times.

When the value of $P_0^{t=t2}(Z)$ is recorded and optionally the value of the offset $\text{Off}_Z$ obtained at this step, the touch probe 22 is moved back to its original position shown in FIG. 3 so as to undo the contact between the touch probe 22 and the tool 10.

Steps 42 and 44 could be performed in any order, and by a same probe or two distinct probes.

From step 44, the method 40 goes to step 46, to contact the touch probe 22 at a third point $P_{32}$ having a known position on the X- and Z-axes and record a coordinate of the reference point $P_0$ of the tool on the X- and Z-axes. The point $P_{32}$ is not aligned with the sides 24 or 26, and as such has a X-coordinate different from the X-coordinate of the point $P_{24}$, and a Z-coordinate different from the Z-coordinate of the point $P_{26}$.

Referring more specifically to FIGS. 6, 7a and 7b, a numerical command moves the tool 10 along the path 3 based on information obtained during calibration and information obtained at steps 42 and 44. Calibration information includes a position of the point $P_{32}$, namely $X_{32}$, $Z_{32}$, in the reference frame RF and the numerical command moves the tool 10 to contact specifically the point $P_{32}$. The point $P_{32}$ is in a predetermined direction PD which is in-plane with the X- and Z-axes and at an angle α with respect to the X- and Z-axes. The angle α is determined at calibration. In one embodiment, the angle α is 45 degrees. Information obtained at steps 42 and 44 include $\text{Off}_X$ and $\text{Off}_Z$ which allow deducing the coordinates of a virtual cutting end point $P_{CE}$, defined as the intersection of a line parallel to the X-axis passing through $P_2$ and a line parallel to the Z-axis passing through $P_3$. The numerical command includes travelling the point $P_{CE}$ onto the predetermined direction PD.

Motion of the tool 10 stops when the point $P_3$ of the cutting end 16 contacts the point $P_{32}$ of the touch probe 22. As the tool 10 contacts the touch probe 22 at time t=t3, the touch probe 22 trigger and electrical signal which commands the tool 10 to stop its course. Coordinates of the reference point $P_0$ are read and the X- and Z-coordinates of the reference point $P_0^{t=t3}(X)$, $P_0^{t=t3}(Z)$ and recorded by the ECU. It is contemplated that the corners 34, 38 or 38 could have been alternatively used.

The coordinates of the reference point $P_0^{t=t3}(X)$, $P_0^{t=t3}(Z)$ may be used to deduce the radius R of the cutting end 16 in a below step.

From step 46, the method 40 goes to step 48, to determine the radius R of the cutting end 16 by the ECU.

As best seen in FIG. 7b, when the cutting end 16 contacts the corner 32 at the point $P_{32}$, the radius R may be obtained by:

$$R = d(1+\sqrt{2}) \qquad \text{(Eq. 6)}$$

when the angle $\alpha$ is 45°, d being a distance between third point $P_{32}$ and the virtual cutting end point $P_{CE}$. The virtual cutting end point $P_{CE}$ is defined as the intersection between a line parallel to the X-axis passing through the point $P_2$ with a line parallel to the Z-axis passing through the point $P_1$.

$$d = \sqrt{(P_{CE}^{t=t3}(X) - X_{32})^2 + (P_{CE}^{t=t3}(Z) - Z_{32})^2} \qquad \text{(Eq. 7)}$$

The cutting end point $P_{CE}$ has a same X-coordinate as the first point $P_1$ and a same Z-coordinate as the second point $P_2$:

$$P_{CE}^{t=t3}(X) = P_1^{t=t3}(X) = P_0^{t=t3}(X) + \text{Off}_X$$

$$P_{CE}^{t=t3}(Z) = P_2^{t=t3}(Z) = P_0^{t=t3}(Z) + \text{Off}_Z \qquad \text{(Eq. 8)}$$

Which leads to:

$$d = \sqrt{(P_0^{t=t3}(X) + \text{Off}_X - X_{32})^2 + (P_0^{t=t3}(Z) + \text{Off}_Z - Z_{32})^2} \qquad \text{(Eq. 9)}$$

From which the radius R is deduced as:

$$R = \frac{1}{\sqrt{(P_0^{t=t3}(X) + \text{Off}_X - X_{32})^2 + (P_0^{t=t3}(Z) + \text{Off}_Z - Z_{32})^2} \left(1 + \sqrt{2}\right)} \qquad \text{(Eq. 10)}$$

when the angle $\alpha$ is 45°. Determination of the radius R when the angle $\alpha$ is not 45° will be given below.

Step 46 could be performed by the same probe as steps 42 and/or 44 or by a distinct probe.

The above method relies on the knowledge of the parameters $X_{24}$, $Z_{26}$, $X_{32}$, $Z_{32}$, which may be determined during a calibration step prior to the method 40.

During calibration, a calibration tool having known dimensions is used. The calibration tool may or may not be similar to the tool 10. The calibration tool has the reference point $P_0$ which coordinates in the reference frame RF are recorded at all time. The cutting end of the calibration tool is brought into contact with the side 24, the X-coordinate of the reference point $P_0$ is recorded, and the X-coordinate $X_{24}$ is determined to be the sum of the X-coordinate of the reference point $P_0$ and a known distance between a point of the cutting end contacting the side 24 and the reference point $P_0$. Similarly, the cutting end of the calibration tool is brought in a second time into contact with the side 26, the Z-coordinate of the reference point $P_0$ is recorded, and the Z-coordinate $Z_{26}$ is determined to be the sum of the Z-coordinate of the reference point $P_0$ and a known distance between a point of the cutting end contacting the side 26 and the reference point $P_0$.

To calibrate the corner 32 and determine the parameters $X_{32}$, $Z_{32}$, the predetermined direction PD is first determined. In one embodiment, the predetermined direction PD is disposed at 45° from the X- and Z-axes. In other embodiment, the predetermined direction PD is disposed at an angle other than 45° from the X- and Z-axes.

Figure 9:
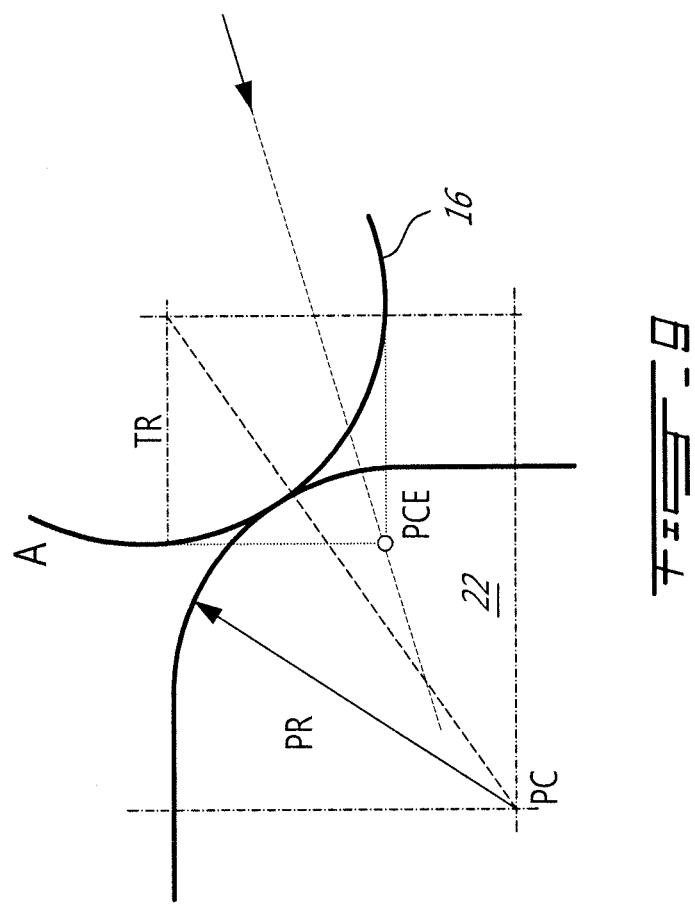
FIG. 9 is a close-up view of the tool of FIG. 1 and the touch probe of FIG. 2a shown in a sixth position relative to each other.

With reference to FIG. 9, should the predetermined direction PD not be at 45°, the calibration process would define the radius PR of the arc A formed by the probe corner 32, 34, 36, 38 and the center coordinates PC of the arc A. The position of the contact point $P_{32}$ on the touch probe 20 may change according to the approach direction and the tool radius size. It may be identified by the calibration as for the case of 45°. When the tool touches the probe, the coordinate of PCE in X and Z directions are recorded. With reference to FIG. 9

$$\begin{pmatrix} d_z \\ d_x \end{pmatrix} = PCE - PC,$$

$d_z = PCE_z - PC_z$, and $d_x = PCE_x - PC_x$. The angular position of the contact point on the probe arc A depends on the tool radius size. From the geometry, when the probe is in contact with the cutting tool:

$$(PR+R)^2 = (R+d_z)^2 + (R+d_x)^2 \qquad \text{(Eq. 11)}$$

The unknown parameter in this equation is the tool radius R. The solution of this equation gives TR as:

$$R = (PR - d_z - d_x) + \sqrt{(PR - d_x - d_z)^2 + PR^2 - d_x^2 - d_z^2} \qquad \text{(Eq. 12)}$$

In the case of angle=45°, as discussed above, geometrically we have:

$$(R+d)^2 = (R)^2 + (R)^2 \qquad \text{(Eq. 13).}$$

The solution of this equation gives TR as:

$$R = d(1+\sqrt{2}) \text{ where}$$

$$d = \sqrt{(P_0^{t=t3}(X) + \text{Off}_X - X_{32})^2 + (P_0^{t=t3}(Z) + \text{Off}_Z - Z_{32})^2}$$

as discussed above.

Using the above method, relatively small radii R of the cutting end 16 such as the one commonly found in in-turn and mill-turn applications, can be determined. In one embodiment, the radius R is smaller than 0.1 inch. In one embodiment, the radius R is comprised between 0.01 and 0.1 inch. The above method may be carried within the turning machine which reduces a number of steps to determine the radius R. The relatively non-invasive method described above also allows determining the radius at any time before a turning operation without removing the tool 10 from the machine.

The above description is meant to be exemplary only, and one skilled in the art will recognize that changes may be made to the embodiments described without departing from the scope of the invention disclosed. For example, the method could be used for tool not related to turning machines. The method could be used with any tool having an arcuate portion, and could preferably be used with tools of relatively small radii. Still other modifications which fall within the scope of the present invention will be apparent to those skilled in the art, in light of a review of this disclosure, and such modifications are intended to fall within the appended claims.

The invention claimed is:

1. A method of determining with at least one electronic control unit a radius of a cutting end of a tool for a turning machine using a touch probe, one of the cutting end and the touch probe being movable as controlled by the at least one electronic control unit relative to a reference frame having a first axis and a second axis and having a reference point trackable in the reference frame of the at least one electronic control unit, the method comprising:
   a) establishing, using the at least one electronic control unit, a first contact point between the touch probe and the cutting end and recording, using the at least one electronic control unit, a first coordinate of the reference point on the first axis, the first contact point having a known coordinate on the first axis; and
   b) establishing, using the at least one electronic control unit, a second contact point between the touch probe and the cutting end and recording, using the at least one electronic control unit, a second coordinate of the reference point on the second axis, the second contact point having a known coordinate on the second axis; and
   c) establishing, using the at least one electronic control unit, a third contact point between the touch probe and the cutting end by moving an end point of the one of the cutting end and the touch probe along a predetermined direction at an angle with the first and second axes as controlled by the at least one electronic control unit and recording, using the at least one electronic control unit, a third coordinate of the reference point on the first axis and a fourth coordinate of the reference point on the second axis upon contact, the pre-determined direction being dependent on the coordinate of the first contact point on the first axis and the coordinate of the second contact point on the second axis, the end point being offset from the reference point by an amount deduced from the first coordinate and the second coordinate recorded at steps a) and b); and
   d) determining, using the at least one electronic control unit, a radius of the cutting end based on the first, second, third and fourth coordinates.

2. The method as defined in claim 1, wherein steps a), b) and c) are performed within the turning machine.

3. The method as defined in claim 1, wherein steps a) and b) are performed in any order.

4. The method as defined in claim 1, wherein at least one of steps a), b) and c) is performed using a different touch probe.

5. The method as defined in claim 1, wherein the probe is fixed relative to the reference frame and the cutting end is movable relative to the reference frame.

6. The method as defined in claim 1, wherein determining the radius R of the tool comprises determining a radius R smaller than 0.1 inch.

7. The method as defined in claim 1, wherein determining the radius R of the tool comprises determining a radius R between 0.01 and 0.1 inch.

8. The method as defined in claim 1, wherein the predetermined direction is at 45degrees from the first and second axes.

9. The method as defined in claim 1, wherein the first axis is an X-axis and the second axis is a Z-axis;
   the predetermined direction is at an angle a from the X-axis and the Z-axis;
   the reference point is $P_0$;
   the known position of the first point of the one of the cutting edge and the touch probe on the X-axis is $X_{24}$;
   step a) is performed at time $t = t1$;
   the first coordinate is $P_0^{t=t1}(X)$;
   the known position of the second point of the one of the cutting edge and the touch probe on the Z-axis is $Z_{26}$;
   step b) is performed at time $t=t2$;
   the second coordinate is $P_0^{t=t2}(Z)$;
   the known position of the third point of the one of the cutting edge and the touch probe on the X-axis is $Z_{32}$;
   step c) is performed at time $t=t3$;
   the third coordinate is $P_0^{t=t3}(X)$;
   the known position of the third point of the one of the cutting edge and the touch probe on the Z-axis is $Z_{32}$;
   the fourth coordinate is $P_0^{t=t3}(Z)$; and
   the radius R is $$R = (1 + \sqrt{2}) \sqrt{\begin{array}{l}(P_0^{t=t3}(X) - P_0^{t=t1}(X) + X_{24} - X_{32})^2 + \\ (P_0^{t=t3}(Z) - P_0^{t=t2}(X) + Z_{26} - Z_{32})^2\end{array}}$$

when the angle α is 45°.

10. The method as defined in claim 1, wherein establishing the first contact point comprises contacting the touch probe on a first flat side, the first flat side being parallel to the second axis;
   establishing the second contact point comprises contacting the touch probe on a second flat side, the second flat side being parallel to the first axis; and
   establishing the third contact point comprises contacting the touch probe on one of a rounded corner and an angled corner joining the first flat side and the second flat side.

11. A method of determining with at least one electronic control unit a radius of a cutting end of a tool for a turning machine using a touch probe, one of the cutting end and the touch probe being movable as controlled by the at least one electronic control unit relative to a reference frame having a first axis and a second axis and having a reference point trackable in the reference frame of the at least one electronic control unit, the method comprising:
   a) recording, using the at least one electronic control unit, a first coordinate of the reference point on the first axis upon contacting the touch probe and the cutting end at a first contact point having a known coordinate on the first axis;
   b) calculating, using the at least one electronic control unit, a first offset of an end point of the one of the cutting end and the touch probe relative to the reference point on the first axis based on the first coordinate;
   c) recording, using the at least one electronic control unit, a second coordinate of the reference point on the second axis upon contacting the touch probe and the cutting end at a second contact point having a known coordinate on the second axis; and
   d) calculating, using the at least one electronic control unit, a second offset of the end point relative to the reference point on the second axis based on the second coordinate;

e) recording, using the at least one electronic control unit, a third coordinate of the reference point on the first axis and a fourth coordinate of the reference point on the second axis upon moving an end point of the one of the cutting end and the touch probe along a predetermined direction as controlled by the at least one electronic control unit and contacting the touch probe and the cutting end at a third contact point along the predetermined direction, the third contact point having known coordinates on the first and second axes, the predetermined direction being at an angle with the first and second axes and being determined from the coordinate of the first contact point on the first axis and the coordinate of the second contact point on the second axis, the end point calculated using the first and second offsets; and f) determining, using the at least one electronic control unit, a radius of the cutting end based on the first, second, third and fourth coordinates.

12. The method as defined in claim 11, wherein step b) is performed at any time between steps a) and e).

13. A turning machine comprising:
a tool having a cutting end;
a touch probe having two flat faces and one of a rounded and angled corner joining the two flat faces; and
an electronic control unit (ECU) controlling at least one of the tool and the probe to move in a reference frame to establish separate contacts between the probe and the tool at a first point on one of the two flat faces, at a second point on the other one of the two flat faces and at a third point on the one of the rounded and angled corner, the ECU being configured to record coordinates of a reference point of the tool or the probe during the separate contacts so as to calculate a radius of the cutting end.

14. The turning machine as defined in claim 13, wherein the touch probe is fixed and the ECU controls the tool to move in the reference frame.

* * * * *